United States Patent Office 3,255,524
Patented June 14, 1966

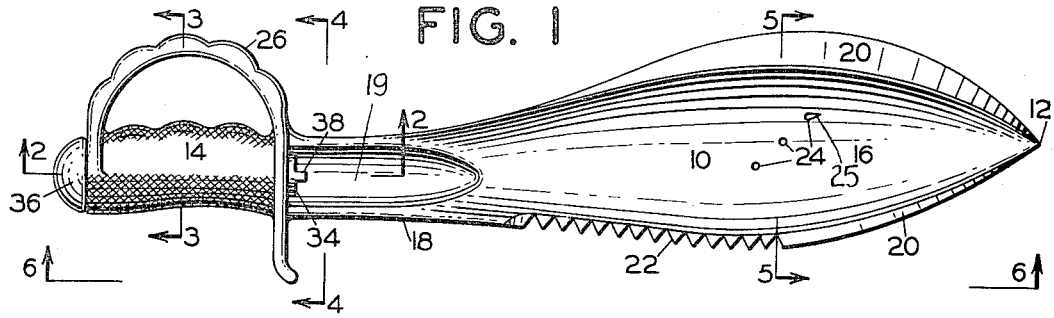
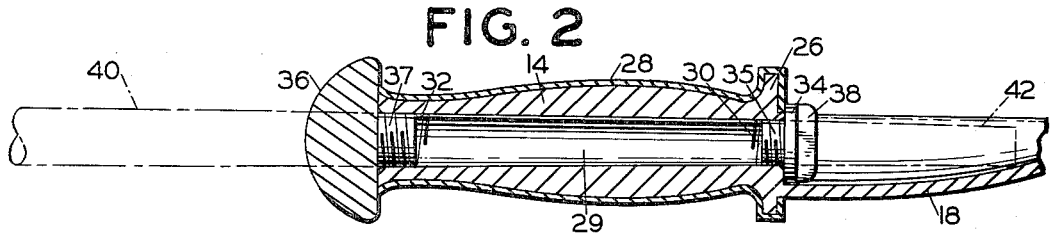
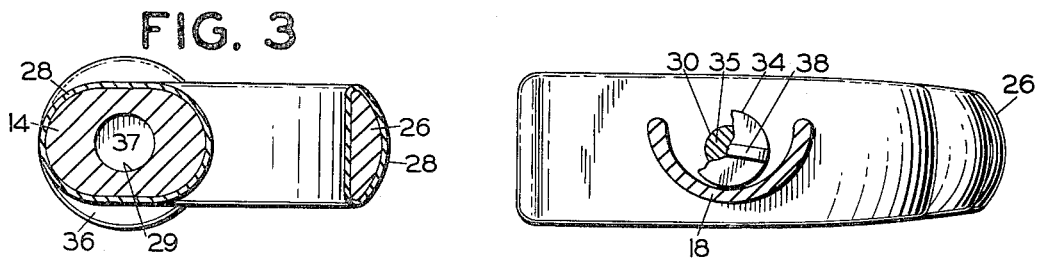
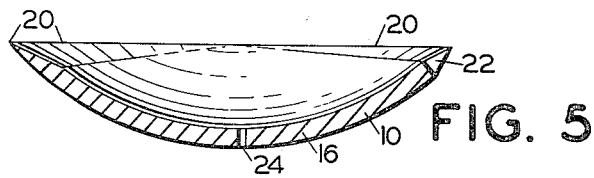
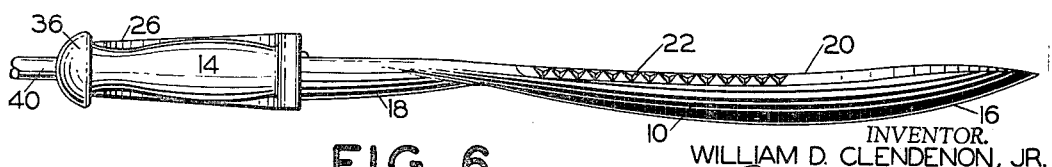
INVENTOR.
WILLIAM D. CLENDENON, JR.
BY Eugene M. Eckelman
ATTORNEY

3,255,524
UTILITY KNIFE
William D. Clendenon, Jr., Stadium Court Apts.,
P.O. Box 926, Portland, Oreg.
Filed June 24, 1963, Ser. No. 290,063
1 Claim. (Cl. 30—165)

This invention relates to new and useful improvements in knife structures.

A primary objective of the present invention is to provide a novel utility knife structure which may be used either as a knife or digging tool, and more particularly to provide a utility knife having in combination a widened blade and means at the handle end to removably receive an extension whereby to facilitate its use as a digging tool.

Another object is to provide a utility knife of the type described which is shaped and contoured in a novel configuration to facilitate good balance and handling in its use either as a knife or digging tool.

Briefly stated the present knife structure comprises a blade element and a handle portion. The handle portion is hollow to form an inner cavity or compartment, and importantly this cavity opens forwardly and rearwardly of the handle for the temporary attachment of an extension which facilitates use of the knife as a digging tool. The forward and rearward ends of the handle cavity have closure members utilized to close the ends of the cavity wherein the latter may be utilized to carry small articles at times other than when the extension is mounted on the knife.

The invention will be better understood and additional objects thereof will become more apparent from the accompanying specification and claim considered together with the accompanying drawings, wherein like numerals of reference indicate like parts, and wherein:

FIGURE 1 is a side elevational view of the present knife;

FIGURE 2 is an enlarged fragmentary longitudinal sectional view taken on the line 2—2 of FIGURE 1;

FIGURE 3 is an enlarged transverse sectional view taken on the line 3—3 of FIGURE 1;

FIGURE 4 is an enlarged transverse sectional view taken on the line 4—4 of FIGURE 1;

FIGURE 5 is an enlarged transverse sectional view taken on the line 5—5 of FIGURE 1; and FIGURE 6 is an edge view of the knife.

Referring in particular to the drawings, the present knife comprises a blade 10 terminating in its forward end in a point 12 and at its rearward end in a main handle 14. Rearwardly of the point 12 the blade is widened at 16, whereby to effectively serve as a digging tool, and then narrows into a rearward portion 18 joining with the handle. As seen in the transverse sectional view of FIGURE 5 the blade 10 has a concavo-convex configuration. The blade portion 18 has a recess 19 therein for a purpose to be described hereinafter.

The blade portion 16 has sharpened edges 20 leading rearwardly from the point 12, one of said edges leading into a saw tooth portion 22. The saw tooth portion 22, as well as the sharpened edge on the opposite side of the knife, terminates forwardly of the handle whereby to provide blunt edges at this portion of the blade. Thus, the knife may be gripped around the blade portion 18 if desired. Blade portion 16 is provided with a plurality of apertures 24 which may serve many functions, such as to reduce the weight of the knife, to allow drainage of water through the blade when the knife is being used as a digging tool, or to secure camouflage material to the blade. As seen in FIGURE 1, one of the apertures 24 terminates at its forward end in a V-shaped notch 25 which may be useful as a nail pulling notch if desired.

Handle 14 has a guard 26, and as best seen in FIGURE 2, the handle and guard have a covering 28. This covering is of insulating materal whereby the operator's hand is insulated from the metal blade to protect the operator against electrical shock in the event of engagement of the knife blade with an electrical wire.

Handle 14 is hollow to form an inner compartment or cavity 29, FIGURE 2, which opens through the front and rear portions of the handle. The said front and rear portions of the cavity are internally threaded at 30 and 32 for threadedly receiving closure caps 34 and 36, respectively. Closure caps 34 and 36 have threaded projections 35 and 37, respectively, engageable with the threaded portions 30 and 32 of the handle cavity. Front cap 34 has a finger engaging tab 38 for rotating it, and is incorporated in recess 19. The knife blade and handle herein assume a shape and relation facilitating good balance and handling of the instrument either as a knife or digging tool. In this regard, reference is made to the edge view of FIGURE 6 wherein it will be seen that the inner surface of the blade leads slightly angularly relative to the handle through a portion of its length and then curves back toward the center line of the handle. Overall, the blade, and most particularly the cutting edges thereof, is longitudinally in alignment with the handle. This has been found to be most effective in maintaining the proper balance of the knife both in digging and cutting.

As best seen in FIGURE 4, and as explained hereinbefore, the front end of cavity 29 in the handle opens into the concaved side of blade portion 18.

When it is desired to use the knife as a digging tool the end caps 34 and 36 are removed from the handle and one end of an extension or auxiliary handle or rod 40 is mounted in the hollow handle. An extension handle 40 is shown in phantom lines in FIGURE 2 to illustrate its positioning.

This extension handle is adapted to project forwardly of the knife handle and into recess 19. As seen in FIGURE 2, the bottom wall of recess 19 extends angularly with relation to the cavity 29 and has a portion thereof in alignment with said cavity, whereby in a mounted position of the extension handle, the latter abuts against the bottom forward end of the recess 19 for limiting the forward mounted engagement with the knife. Furthermore, the extension handle is anchored in place by the internal threaded portions 30 and 32 which engage the periphery thereof. Thus, it is preferred to use a wooden extension handle if possible.

The extension handle 40 may comprise a manufactured extension to be sold with the knife or if desired may merely comprise any available stick cut to size. When the extension is not to be used with the knife, the end caps 34 and 36 are secured in place to form a closed cavity interiorly of the handle for carrying small articles.

The present knife thus doubles effectively as a cutting tool or a digging tool. It has been designed for good balance with either of its uses in that the cutting edges are substantially on the longitudinal center line of the handle and the inner or concave surface of the blade is angled relative to the handle similar to the usual shovel construction. In using the device as a digging tool, it may be gripped around blade portion 18 if desired since as stated before such blade portion has blunt edges. It is a most general purpose of the invention to provide an instrument conductive to all around use but of a size which facilitates handling and carrying by the person. Also, it is clear that the present knife with the extension handle 40 attached thereto may be used as a boat paddle.

It is to be understood that the form of my invention herein shown and described is to be taken as a preferred example of the same and that various changes in the shape, size and arrangement of parts may be resorted to without departing from the spirit of my invention or the scope of the subjoined claim.

Having thus described my invention, I claim:

A knife structure adapted for use either as a cutting or digging tool comprising a widened concaved blade having a digging surface and a longitudinal cutting edge thereon, a longitudinally extending handle integrated with one end of said blade and having forward and rearward ends, means in said handle defining a longitudinally extending internal cavity having forward and rearward threaded openings, a cap threadedly mounted in each of said openings for insertion and removal from said openings, the cavity in said handle being arranged to removably receive an extension rod adapted to project through said handle whereby to facilitate use of the knife as a digging tool, and means defining a recessed portion in the blade adjacent the forward end of said handle, said recessed portion having a bottom wall which extends angularly relative to the cavity and which has a portion thereof in alignment with said cavity whereby to form an abutment for an extension rod projecting through said handle.

References Cited by the Examiner

UNITED STATES PATENTS

| | | | |
|---|---|---|---|
| 107,419 | 9/1870 | Spencer | 30—123.3 |
| 878,524 | 2/1908 | Gregory | 30—123.3 |
| 2,252,119 | 8/1941 | Edmonds | 30—123.3 |
| 2,453,525 | 11/1948 | McNeill | 30—123 |
| 2,795,043 | 6/1957 | Fleischer | 30—123.3 |

FOREIGN PATENTS 462,583   1/1950   Canada.

WILLIAM FELDMAN, *Primary Examiner*.

JAMES L. JONES, JR., *Examiner*.